Nov. 3, 1953 W. W. WIGHTMAN 2,657,612
CONTROL FOR PHOTOGRAPHIC COPYING APPARATUS
Filed Jan. 10, 1951 2 Sheets-Sheet 1
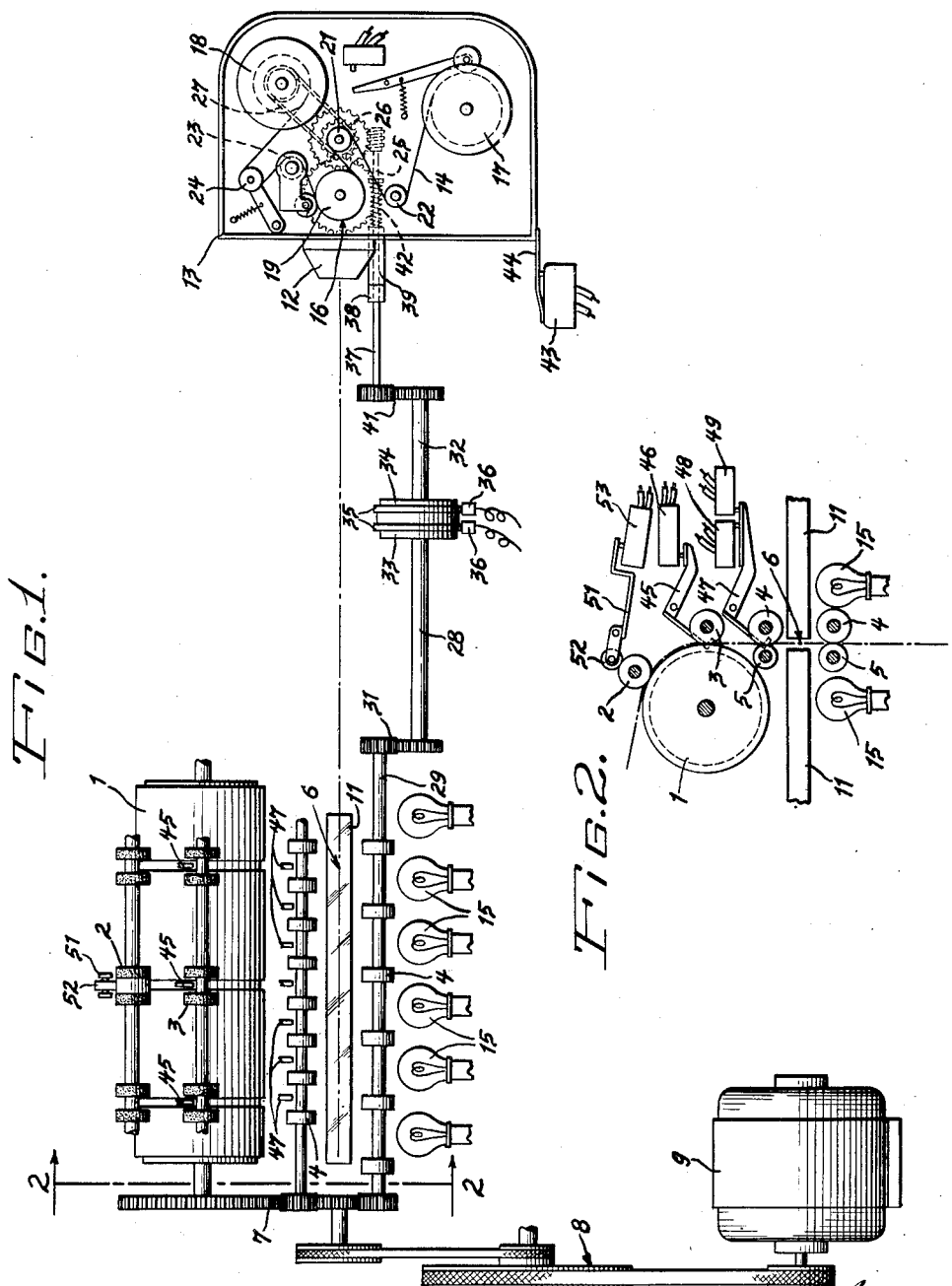
Inventor:
William W. Wightman
By Robert F. Miehle
Atty.

Nov. 3, 1953 W. W. WIGHTMAN 2,657,612
CONTROL FOR PHOTOGRAPHIC COPYING APPARATUS
Filed Jan. 10, 1951 2 Sheets-Sheet 2

Inventor:
William W. Wightman
By Robert F. Miehle, Jr.
Atty.

Patented Nov. 3, 1953

2,657,612

UNITED STATES PATENT OFFICE 2,657,612

CONTROL FOR PHOTOGRAPHIC COPYING APPARATUS

William W. Wightman, Chicago, Ill., assignor to Bell & Howell Company, Chicago, Ill., a corporation of Illinois Application January 10, 1951, Serial No. 205,270

7 Claims. (Cl. 88—24)

The present invention relates particularly to the control of micro-recording apparatus in which sheets or documents are fed in succession through the photographic field of a camera for the photographing of the sheets and more particularly to an electrical control which is energized from a direct current source.

Objects of the invention reside in the provision of a novel, effective and reliable electrical control for photographic copying apparatus which is energized from a direct current source, which permits of conversion of a control energized from an alternating current source to a control energized from a direct current source without necessitating changes in a substantial portion of the control, which, utilizing a direct to alternating current convertor, does not require one of large capacity, which utilizing a direct current driving motor energized directly from a direct current source, delays the starting of the motor until the E. M. F. of the output of the convertor builds up to an extent sufficient for the proper energization of the alternating current energized portion of the control, and which embodies in its direct current circuiting a control which is responsive to superposed or overlapping sheets fed by the sheet feeding means of the apparatus to stop the sheet feeding mechanism with a view toward preventing the feeding of superposed or overlapping sheets through the photographic field of the camera and thus insuring that all sheets fed through the apparatus are photographed as intended, this double document sheet feed prevention control per se being the subject matter of the copending application for United States Letters Patent of Frank L. Weninger, Serial No. 191,987, filed October 25, 1950, for improvement in Double Sheet Feed Prevention Control.

The invention will be better understood by reference to the accompanying drawing forming a part hereof and in which—

Figure 1 is a schematic view in side elevation showing various elements of a photographic copying apparatus in the form of a micro-recorder;

Figure 2 is a sectional view taken substantially on the line 2—2 of Figure 1.

Figure 3:
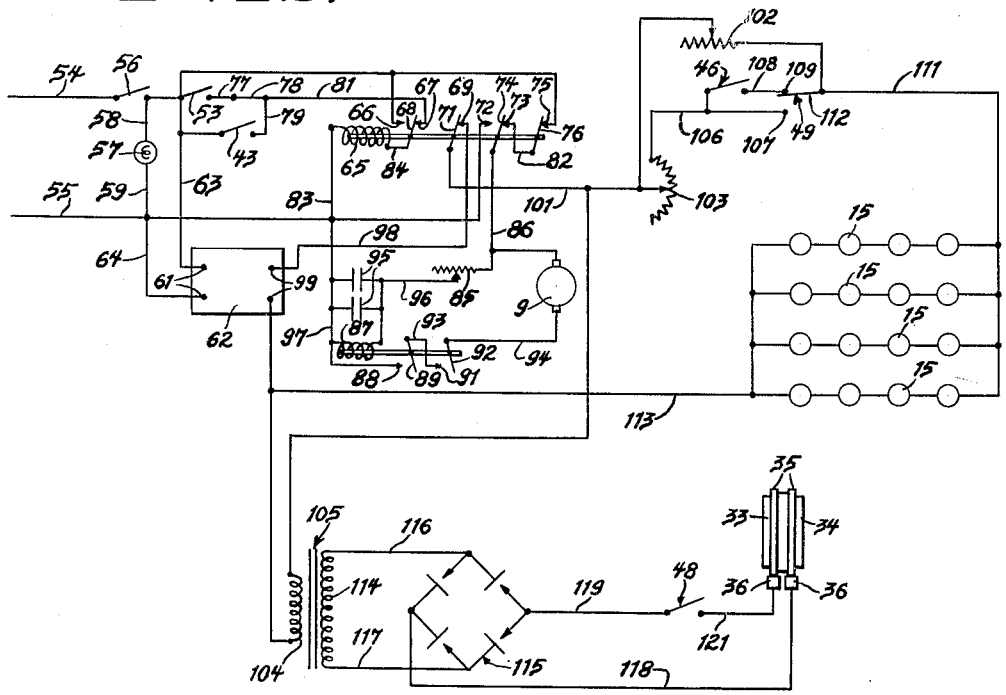
Figures 3 and 4 are wiring diagrams of the control of my invention and showing it in different conditions of control.

Referring to Figures 1 and 2 of the drawing, a horizontal rotatable feed drum 1 receives sequentially fed sheets or documents, and rotatable pressure rollers 2 and 3 are yieldably urged into pressure engagement with the feed drum, and the sheets or documents, as they are fed to the feed drum, are engaged between the feed drum and pressure rollers 2 and 3 and are fed downwardly by the feed drum as it is rotated.

A pair of vertically spaced horizontal rotatable feed rollers 4 are arranged below the feed drum 1 in parallelism therewith and rotatable pressure rollers 5 are yieldably urged into pressure engagement respectively with the feed rollers 4. Sheets fed edgewise downwardly from the feed drum 1 engage between the pairs of rollers 4 and 5 and are vertically and downwardly fed edgewise through a photographic field 6 between the pairs of rollers 4 and 5, this photographic field being that of the camera of the apparatus, hereinafter described. The sheet path is indicated by the dot and dash line in Figure 2. The feed drum 1 and the feed rollers 4 are driven in timed relation by gearing, generally designated at 7 in Figure 1, which is driven through a belt and pulley transmission 8 from a direct current electric drive motor 9.

A pairs of converging reflectors 11 are arranged in a horizontal plane and transversely of the vertical sheet path and obliquely to and on opposite sides of the photographic field 6 for reflecting images of opposite faces of the fed sheets as they pass the photographic field to the objective 12 of a photographic camera 13 for the photographing of opposite faces of the fed sheets on a sensitized film or strip 14 in the camera. Two horizontal banks of incandescent electric lamps 15 are arranged respectively on opposite sides of the vertical sheet path in parallelism therewith and immediately below the photographic field 6 and reflectors 11 for illuminating opposite faces of the fed sheets at the photographic field for the photographing of said opposite faces.

The camera 13 is of the flow type and is provided therein with strip feeding means for feeding the sensitized strip 14 in the camera through the exposure field 16 of the camera at the rear of the camera objective 12, and, see Figure 1, the strip feeding means comprises as follows:

Vertically spaced feed and take up reels 17 and 18 are rotatably mounted in the camera in the usual manner providing for installation of the reels in and removal thereof from the camera. A rotatably mounted exposure drum 19 of relatively large diameter is disposed to the rear of the objective 12 and supports the sensitized strip 14 at the exposure field 16 of the camera. A rotatably mounted idler roller 21 is disposed to the rear of the exposure drum 19, a rotatably mounted idler roller 22 is disposed below the exposure drum, and two vertically spaced rotatably mounted idler rollers 23 and 24 are disposed above the exposure drum.

The sensitized strip 14 extends from a roll of the strip on the lower or feed reel 17 about the roller 22, then in an opposite manner about the roller 21, then in an opposite manner about the exposure drum 19, then in an opposite manner about the roller 23, then in an opposite manner about the roller 24, and finally to a roll of the sensitized strip on the upper or take up reel 18 on which the strip is wound as it is exposed.

A shaft 25 is rotatably mounted on the camera 13 in parallelism with the focal axis of the camera and the exposure drum 19 is driven from this shaft through gearing generally designated at 26, and the take up reel 18 is driven from the gearing 26 by a yielding belt and pulley drive 27 to take up the sensitized strip as it is fed by rotation of the exposure drum 19.

A rotatably mounted shaft 28 is disposed in parallelism with the shaft 29 of the lower sheet feed roller 4, and is driven therefrom by gearing 31, so that the shaft 28 is driven from the motor 9. A rotatably mounted shaft 32 is alined with the shaft 28 and is selectively driven therefrom by an electromagnetic clutch comprising a solenoid clutch element 33 secured on the shaft 28 and a clutch element 34 of magnetic material secured on the shaft 32 and attracted into frictional engagement with the clutch element 33 when the latter is energized, the clutch element 33 being energized through slip rings 35 thereon and brushes 36 respectively contacting the slip rings.

A rotatable shaft 37 is alined with the camera drive shaft 25, and is connected with the camera shaft to drive the same by a normally engaged clutch comprising toothed clutch elements 38 and 39 respectively secured on these shafts. The shaft 37 is driven from the shaft 32 by gearing 41, so that assuming the clutch 33—34 to be engaged, the sensitized strip feeding means is driven from the motor 9 in timed relation with the sheet feeding means which is also driven from the motor, the sheet feeding means comprising the feed drum 1 and the rollers 4 driven from the motor and the pressure rollers 2, 3 and 5. When the sheets, fed by the sheet feeding means, are being photographed on the sensitized strip 14, the electromagnetic clutch is engaged so that the sensitized strip in the camera is fed in timed relation with the sheets as they pass through the photographic field 6 and in the direction opposite that in which the sheets are fed, and when the sheets are not being fed, the electromagnetic clutch is normally disengaged so that the sheet feeding mechanism may be driven by the motor in readiness to feed sheets without necessitating feeding the sensitized strip in the camera, the electromagnetic clutch being controlled in this respect as hereinafter described.

The camera is detachably mounted on the apparatus and is installed on and removed from the apparatus respectively with downward and upward movement of the camera in a manner unnecessary to be described, and to permit such movement of the camera, the drive clutch element 39 is slidably keyed on the shaft 25 and is yieldably urged outwardly of the camera to engage the clutch element 38 by a spring 42 reacting on this shaft, the clutch element 39 being retracted to clear the clutch element 38 during installation and removal of the camera.

A normally closed camera controlled switch 43 is mounted on the apparatus and is provided with an actuating arm 44 which is engaged by the camera when the camera is mounted on the apparatus to open this switch and which is disengaged from the camera when the camera is removed from the apparatus to close this switch.

A pivotally mounted switch arm 45 is yieldably urged into a normal position in which one end thereof in the form of spaced fingers projects across the path of the fed sheets as they are fed toward the photographic field 6, and a fed sheet engages this arm and moves and maintains it out of the sheet path while the switch arm is under the control of the sheet. A light control switch 46, under the control of the switch arm 45, is yieldably urged into open position and remains open when the switch arm is in its normal position and is closed by the switch arm when the switch arm is positioned under the control of a fed sheet.

A pivotally mounted switch arm 47 is yieldably urged into a normal position in which one end thereof in the form of spaced fingers projects across the path of the fed sheets as they are fed toward the photographic field 6, and a fed sheet engages this arm and moves and maintains it out of the sheet path while this switch arm is under the control of the sheet. Clutch and light control switches 48 and 49 are under the control of the switch arm 47, and the clutch control switch 48 is yieldably urged into open position and remains open when the switch arm 47 is in its normal position and is closed by this switch arm when this switch arm is positioned under the control of a fed sheet. The light control switch 49 is a double throw switch and is yieldably urged into position closing one side thereof and remains in this position when the switch arm 47 is in its normal position and is positioned in its other position closing the other side thereof by this switch arm when this switch arm is positioned under the control of a fed sheet.

The switch arm 47 is positioned closer to the photographic field 6 than the switch arm 45 and these switch arms are spaced a distance lineally of the sheet path less than the corresponding dimension of the fed sheets, so that the switches 48 and 49 are under the control of a fed sheet in following overlapping relation with the control of the switch 46 by the fed sheet for a purpose hereinafter appearing.

Inasmuch as the pressure roller 2 is yieldably urged into pressure engagement with the feed drum 1, the passage of a sheet therebetween displaces the pressure roller radially of the feed drum and the passage of superposed or overlapping sheets therebetween displaces the pressure roller to a greater extent. A pivotally mounted switch arm 51 is provided with a roller 52 which engages the pressure roller 2 in diametrically opposite relation with the feed drum 1. The switch arm 51 is yieldably urged in the direction to engage the roller 52 against the pressure roller 2, so that the switch arm is actuated with displacement of the pressure roller 2 to an extent corresponding with the sheet thickness between the pressure roller and the feed drum.

A normally open sheet detector switch 53 is under the control of the switch arm 51 and remains open when the switch arm is in normal position or when it is actuated by a sheet of a thickness to which the switch arm and detector switch are adjusted as the sheet is fed between the pressure roller 2 and the feed drum 1. However, when superposed or overlapping sheets are fed between the pressure roller 2 and the feed drum, the pressure roller is displaced and the switch arm 51 is actuated to a sufficient extent to close the detector switch 53 for stopping the sheet feeding means in a manner hereinafter described.

Figure 4:
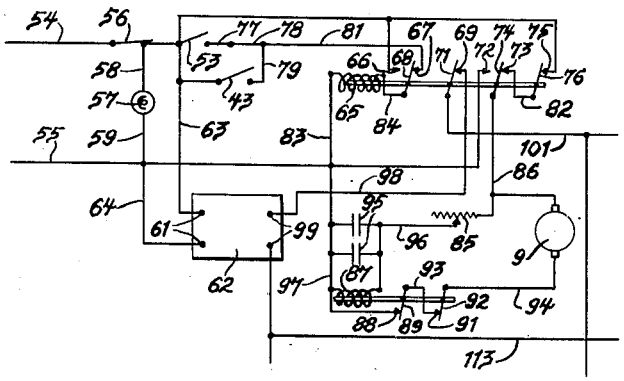

Referring to Figures 3 and 4, opposite pole direct current supply wires 54 and 55 are supplied from a suitable source of direct current, and a main control switch 56 has one terminal thereof connected with the supply wire 54 and forms a continuation thereof. An indicator lamp 57 is connected across the other terminal of the switch 56 and the supply wire 55 by wires 58 and 59 to indicate when the circuiting of the apparatus is energized. The direct current input 61 of a conventional direct to alternating current convertor 62, preferably of the vibrator type having a built in voltage control, is also connected across the said other terminal of the switch 56 and the supply wire 55 by a branch wire 63 and a wire 64.

An electromagnetic relay comprises a relay coil 65, a double throw relay switch comprising side contacts 66 and 67 and an intermediate contact in the form of a switch arm 68 alternately contactable with the side contacts, a single throw relay switch comprising a contact 69 and a cooperating contact 71 in the form of a switch arm, a second double throw relay switch comprising side contacts 72 and 73 and an intermediate contact 74 in the form of a switch arm alternately contactable with the side contacts, and a second single throw relay switch comprising a contact 75 and a cooperating contact 76 in the form of a switch arm. These relay switches are under the control of the relay coil 65 and their switch arms are yieldably urged so that when this relay coil is deenergized, the switch arms 68, 71, 74 and 76 contact respectively the contacts 67, 69, 73 and 75 as shown in Figures 3 and 4, and when this relay coil is energized, the switch arms 68 and 74 contact respectively the contacts 66 and 72 and the switch arms 71 and 76 are out of contact with the contacts 69 and 75.

The aforesaid other terminal of the main control switch 56 is connected to one terminal of the detector switch 53, the switch contacts 66 and 75 and one terminal of the camera controlled switch 43 by the branch wire 63. The other terminal of the detector switch 53 is connected by a wire 77 with one terminal of a normally closed manually controlled switch 78, and the other terminal of the switch 78 is connected with the other terminal of the switch 43 by a wire 79 and with the switch contact 67 by a wire 81. The switch arm 76 and the contact 73 are connected by a wire 82, so that the switch arms 74 and 76 and the contacts 73 and 75 are connected in series to reduce arcing and heating due to the current to which they are subjected. One terminal of the relay coil 65 is connected with the supply wire 55 by a wire 83, and the other terminal of this relay coil is connected to the intermediate contact or switch arm 68 by a wire 84. The supply wire 55 is connected to the contact 72, and the intermediate contact or switch arm 74 is connected with one terminal of the drive motor 9 and with one terminal of a variable resistance 85 by a branch wire 86.

Another electromagnetic relay comprises a relay coil 87, a relay switch comprising a contact 88 and a cooperating contact 89 in the form of a switch arm, and a second relay switch comprising a contact 91 and a cooperating contact 92 in the form of a switch arm. The switch arm 89 and the contact 91 are connected by a wire 93, so that the switch arms 89 and 92 and the contacts 88 and 91 are connected in series to reduce arcing and heating due to the current to which they are subjected. These relay switches 88—89 and 91—92 are under the control of the relay coil 87 and their switch arms are yieldably urged so that when this relay coil is deenergized, the switch arms 89 and 92 are out of contact respectively with the contacts 88 and 91 as shown in Figure 3, and when this relay coil is energized, these switch arms contact these contacts as shown in Figure 4.

The other terminal of the drive motor 9 is connected with the switch arm 92 by a wire 94. One pair of terminals of two condensers 95 are connected with the other terminal of the resistance 85 and with one terminal of the relay coil 87 by a branch wire 96, and the other pair of terminals of the condensers 95, the other terminal of the relay coil 87 and the contact 88 are connected with the supply wire 55 by a branch wire 97, the condensers being thus connected in shunt with this relay coil and the resistance 85 being connected in series with the condensers and with the relay coil. Two small condensers are preferable to one large one from a practical standpoint to provide adequate capacitance.

A wire 98 connects one terminal of the alternating current output 99 of the convertor 62 with the contact 69, and, see Figure 3, a branch wire 101 connects the switch arm 71 with one terminal of each of high and low resistances 102 and 103 and with one terminal of the primary 104 of a transformer 105. A branch wire 106 connects the other terminal of the resistance 103 with one terminal of the switch 46 and with one side contact 107 of the double throw switch 49, and a wire 108 connects the other terminal of the switch 46 with the other side contact 109 of the switch 49. A branch wire 111 connects the other terminal of the resistance 102 and the intermediate contact or switch arm 112 of the switch 49 with one terminal of series connected groups of the illuminating lamps 15, and a branch wire 113 connects the other terminal of the series connected groups of illuminating lamps and the other terminal of the transformer primary 104 with the other terminal of the alternating current output 99 of the convertor 62.

The terminals of the secondary 114 of the transformer 105 are connected respectively with the input terminals of a full wave rectifier 115 by wires 116 and 117. One output terminal of the rectifier is connected with one of the brushes 36 of the solenoid clutch element 33 by a wire 118, and the other output terminal of the rectifier is connected with one terminal of the sheet controlled switch 48 by a wire 119. The other terminal of the switch 48 is connected with the other brush 36 of the solenoid clutch element 33 by a wire 121, so that the switch 48 is connected in series with the solenoid clutch element to engage and disengage the clutch 33—34 respectively with closing and opening of this switch.

It will be observed that the circuits of the direct current drive motor 9, the relay coils 65 and 87, and the input 61 of the convertor 62 are supplied directly from a suitable source of direct current through the supply wires 54, 55 and the main control switch 56, that the circuits of the illuminating lamps 15, the primary 104 of the transformer 105, and the input of the rectifier 115 are supplied with alternating current from the output 99 of the convertor 62, and that the circuit of the solenoid clutch element 33 is supplied with direct current from the output of the rectifier.

Normally the sheet controlled switches 46 and 48 are open and the side contact 109 of the double throw switch 49 which is in series with the switch 46 is contacted by the switch arm 112, and assuming the apparatus to be in functioning condition with the drive motor 9 energized and driving the sheet feeding means and the clutch and illuminating lamp circuits energized by the convertor 62, a low voltage is maintained on the illuminating lamps 15 through the high resistance 102 to maintain the filaments of the lamps at a low temperature below normal brilliancy thereof and consequently in a relatively high resistant condition, so that the output of the convertor is not subjected to excessive surging incident to bringing the illuminating lamps to normal brilliancy from a completely deenergized and consequently low resistant condition, the resistance 102 being variable to adjust the low voltage impressed upon the illuminating lamps.

Recalling that the switches 48 and 49 are under the control of a sheet fed by the sheet feeding means in following overlapping relation with the control of the switch 46 by the fed sheet, each sheet as it is fed by the sheet feeding means toward the photographic field 6 engages the switch arm 45 and actuates it to close the light control switch 46 and thus fully energize the illuminating lamps 15 through the resistance 103 a short time before the sheet reaches the photographic field 6 so that the illuminating lamps reach proper brilliance before the sheet enters the photographic field, the resistance 103 being variable to adjust the brilliance of the illuminating lamps. As the sheet approaches closer to the photographic field after it has closed the switch 46 and immediately before it enters the photographic field, the fed sheet engages the switch arm 47 and actuates it to respectively open and close the circuits through the side contacts 109 and 107 of the light control switch 49 and thus fully energize the illuminating lamps through the side contact 107 and resistance 103 and to close the clutch control switch 48, so that full energization of the illuminating lamps is continued and the clutch 33—34 is engaged to feed the sensitized strip 14 in the camera during passage of the fed sheet through the photographic field for the photographing thereof, the switches 46, 48 and 49 returning to their normal positions after the fed sheet passes out of controlling relation with the switch arms 45 and 47.

By way of summarization, it will be observed that direct current supply conductors comprise the main control switch 56, that the relay switches 88—89 and 91—92, supplementing each other, are connected in series with the drive motor 9, that the condensers 95 are connected in shunt with the relay coil 87, that the resistance 85 is connected in series with this relay coil and with these condensers, that circuit connections connect the drive motor 9 and relay switches 88—89 and 91—92 and the relay coil 87, condensers 95 and resistance 85 with said supply conductors under the control of the switch 56 and comprise the double throw relay switch 72—73—74, supplemented by the relay switch 75—76, having its side contacts 72—73 respectively connected with said supply conductors and having its intermediate contact 74 connected in circuit with the drive motor and the relay switches 88—89 and 91—92 and with the relay coil 87, condensers 95 and resistance 85, that circuit connections connect the relay coil 65 with said supply conductors under the control of the switch 56 and comprise the intermediate contact 68 of the double throw relay switch 66—67—68 connected with the relay coil 65, the side contact 66 of this switch, which is contacted by the intermediate contact 68 when the relay coil 65 is energized, in which condition it deenergizes the drive motor, connected with one of said supply conductors and the detector switch 53 connected between the other side contact 67 of the relay switch 66—67—68 and said one supply conductor to place the relay coil 65 in motor deenergizing condition responsive to superposed sheets fed by the sheet feeding means, and that the relay switch 69—71 is connected in that common circuit of the illuminating lamps 15 and electromagnetic clutch 33—34 to energize and deenergize the same respectively with energization and deenergization of the drive motor.

Figure 3 illustrates the control in non-functioning condition by reason of the main control switch 56 being open. In this condition and normally, the relay coil 65 is deenergized so that the relay switch contacts 67—78, 69—71, 73—74 and 75—76 are in contact and the detector switch, the clutch and illuminating lamp, and the drive motor circuits are thus closed to the extent of these contacts, and in this condition the relay coil 87 is also deenergized so that the relay switches 88—89 and 91—92 are open and the drive motor circuit is open to the extent of these switches.

Assuming the contacts 67—68 of the relay switch 66—67—68 and the contacts 73—74 of the relay switch 72—73—74 to be in contact and the relay switches 69—71 and 75—76 to be closed, closure of the main control switch 56 energizes the relay coil 87 and charges the condensers 95 through the resistance 85. However, these condensers being in shunt with the relay coil and the resistance being in series with the condensers and with this relay coil, an interval elapses, due to the retardance of charging of the condensers, before a sufficient voltage drop is developed across the relay coil 87 to close the switches 88—89 and 91—92 and thus energize the drive motor 9, so that energization of the motor is delayed for this interval after the main control switch has been closed, the resistance 85 being variable to adjust the delay interval as conditions require.

Closure of the main control switch 56 also energizes the input 61 of the convertor 62, so that during the delay interval between the closure of the main control switch and the energization of the drive motor and consequent operation of the sheet feeding means, the E. M. F. of the output 99 of the convertor builds up to a sufficient extent for the proper energization of the clutch and illuminating lamp circuits. Consequently, sheets cannot be fed by the sheet feeding means until the clutch and illuminating lamp circuits are properly energized for the photographing operation, it being observed that a convertor of large capacity is not required because the drive motor is energized directly from the direct current source as well as the relay coils 65 and 87.

Upon closure of the detector switch 53 by reason of superposed or overlapping sheets having engaged between the feed drum 1 and the pressure roller 2 as above described, the relay coil 65 is energized through the main control, detector and manually controlled switches 56, 53 and 78 and the intermediate contact 68 contacting the side contact 67 of the relay switch 66—67—68.

Energization of the relay coil 65 causes the intermediate contacts 68 and 74 of the relay switches 66—67—68 and 72—73—74 to move out of contact respectively with the side contacts 67 and 73 and into contact with the side contacts 66 and 72 and to open the relay switches 69—71 and 75—76. The relay coil 65 being energized, contact of the intermediate contact 68 with the side contact 66 maintains the relay coil 65 energized after this intermediate contact has moved out of contact with the side contact 67, despite opening of the detector switch 53 as by removal of the superposed or overlapping sheets from between the feed drum 1 and pressure roller 2, positioning of the contacts 74 and 76 of the relay switches 72—73—74 and 75—76 out of contact with the contacts 73 and 75 opens the circuit of the drive motor 9 to terminate the drive of the sheet feeding means, opens the circuit of the relay coil 87 and disconnects the condensers 95 from the supply wire 54, and contact of the intermediate contact 74 with the side contact 72 connects the wire 86 with the supply wire 55 so that the terminals of the condensers 95 are connected together through the resistance 85 for quickening the stoppage of the drive motor, and opening of the switch 69—71 deenergizes the clutch and illuminating lamp circuits.

After the control has stopped the apparatus, as by closure of the detector switch 53, and the detector switch has again been opened by removal of the superposed or overlapping sheets, the apparatus is conveniently restored to operating condition by momentarily opening the main control switch 56, which opening deenergizes the relay coil 65 and restores the relay switches 66—67—68, 69—71, 72—73—74, and 75—76 to their normal condition as above described and as shown in Figures 3 and 4, whereupon closure of the main control switch 56 places the apparatus in operating condition which includes delayed energization of the drive motor 9 and consequent drive of the sheet feeding means after the clutch and illuminating lamp circuits are properly energized as above described.

The camera controlled switch 43 being connected in series with the side contact 67 of the relay switch 66—67—68 in shunt relation with the detector switch 53, closure of the switch 43 by removal of the camera 13 of the apparatus as above described, causes energization of the relay coil 65 and consequent stoppage of the sheet feeding means to prevent the feeding of sheets by the sheet feeding means while the camera is not in photographing position on the apparatus.

When it is desired to temporarily photograph sheets of greater thickness than that to which the detector switch 53 is adjusted, the manually controlled switch 78 is opened to render the detector switch inoperative to energize the relay coil 65, the switch 78 being again closed when it is desired to have the detector switch function.

While I have thus described my invention, I do not wish to be limited to the precise details described, as changes may be readily made without departing from the spirit of my invention, but having thus described my invention, I claim as new and desire to secure by Letters Patent the following:

1. In a photographic apparatus, the combination of sheet feeding means for successively feeding sheets through a photographic field, a direct current motor for driving said sheet feeding means, direct current supply conductors comprising a switch, a direct-to-alternating-current convertor having its input connected with said conductors under the control of said switch, an electrically energizable instrumentality under the control of sheets fed by and cooperating with said sheet feeding means for photographing sheets fed thereby and connected with the output of said convertor for energization thereby, an electromagnetic relay comprising a relay coil and a relay switch under the control of said relay coil to be closed with energization of said relay coil and connected in series with said motor, a condenser connected in shunt with said relay coil, a resistance connected in series with said relay coil and with said condenser, and circuit connections connecting said motor and relay switch and said relay coil, condenser and resistance with said supply conductors under the control of said first mentioned switch.

2. In a photographic apparatus, the combination of sheet feeding means for successively feeding sheets through a photographic field, a direct current motor for driving said sheet feeding means, direct current supply conductors comprising a switch, a direct-to-alternating-current convertor having its input connected with said conductors under the control of said switch, an electrically energizable instrumentality under the control of sheets fed by and cooperating with said sheet feeding means for photographing sheets fed thereby and connected with the output of said convertor for energization thereby, an electromagnetic relay comprising a relay coil and relay switch under the control of said relay coil to be closed with energization of said relay coil and connected in series with said motor, a condenser connected in shunt with said relay coil, a resistance connected in series with said relay coil and with said condenser, and circuit connections connecting said motor and relay switch and said relay coil, condenser and resistance with said supply conductors under the control of said first mentioned switch and comprising a double throw switch having its side contacts respectively connected with said conductors and its intermediate contact connected in circuit with said motor and relay switch and with said relay coil, condenser and resistance.

3. In a photographic apparatus, the combination of sheet feeding means for successively feeding sheets through a photographic field, a direct current motor for driving said sheet feeding means, direct current supply conductors comprising a switch, a direct-to-alternating-current convertor having its input connected with said conductors under the control of said switch, an electrically energizable instrumentality under the control of sheets fed by and cooperating with said sheet feeding means for photographing sheets fed thereby and connected with the output of said convertor for energization thereby, an electromagnetic relay comprising a relay coil and a relay switch under the control of said relay coil to be closed with energization of said relay coil and connected in series with said motor, a condenser connected in shunt with said relay coil, a resistance connected in series with said relay coil and with said condenser, switch means comprising a double throw switch, circuit connections connecting said motor and relay switch and said relay coil condenser and resistance with said supply conductors under the control of said first mentioned switch and comprising said double throw switch having its side contacts respectively connected with said conductors and its intermediate contact connected in circuit with said motor and relay switch and with said relay coil, condenser and resistance, and said switch means being connected in circuit with said instrumentality to energize and deenergize the same respectively when said double throw switch is in and out of motor energizing position.

4. In a photographic apparatus, the combination of sheet feeding means for successively feeding sheets through a photographic field, a direct current motor for driving said sheet feeding means, direct current supply conductors comprising a switch, a direct-to-alternating-current convertor having its input connected with said conductors under the control of said switch, an electrically energizable instrumentality under the control of sheets fed by and cooperating with said sheet feeding means for photographing sheets fed thereby and connected with the output of said convertor for energization thereby, an electromagnetic relay comprising a relay coil and relay switch under the control of said relay coil to be closed with energization of said relay coil and connected in series with said motor, a condenser connected in shunt with said relay coil, a resistance connected in series with said relay coil and with said condenser, a second electromagnetic relay comprising a relay coil and relay switch means under the control of this relay coil and comprising a double throw switch, circuit connections connecting said motor and first mentioned relay switch and said first mentioned relay coil, condenser and resistance with said supply conductors under the control of said first mentioned switch and comprising said double throw switch having its side contacts respectively connected with said conductors and its intermediate contact connected in circuit with said motor and first mentioned relay switch and with said first mentioned relay coil, condenser and resistance, said second relay switch means being connected in controlling relation with said second relay coil for alternately energizing said motor and maintaining said second relay coil in motor deenergizing condition, detector switch means connected in controlling relation with said second relay coil in shunt relation with said second relay switch means and responsive to superposed sheets fed by said feeding means to place said second relay coil in motor deenergizing condition, and circuit connections connecting said second relay coil and second relay switch means and said second relay coil and detector switch means with said supply conductors under the control of said first mentioned switch.

5. In a photographic apparatus, the combination of claim 4 and further comprising said second relay switch means being connected in the circuit of said electrically energizable instrumentality to energize and deenergize the same respectively when said double throw switch is in and out of motor energizing position.

6. In a photographic apparatus, the combination of sheet feeding means for successively feeding sheets through a photographic field, a direct current motor for driving said sheet feeding means, direct current supply conductors comprising a switch, a direct-to-alternating-current convertor having its input connected with said conductors under the control of said switch, an electrically energizable instrumentality under the control of sheets fed by and cooperating with said sheet feeding means for photographing sheets fed thereby and connected with the output of said convertor for energization thereby, an electromagnetic relay comprising a relay coil and relay switch under the control of said relay coil to be closed with energization of said relay coil and connected in series with said motor, a condenser connected in shunt with said relay coil, a resistance connected in series with said relay coil and with said condenser, a second electromagnetic relay comprising a relay coil and relay switch means under the control of this relay coil and comprising two double throw switches, circuit connections connecting said motor and first mentioned relay switch and said first mentioned relay coil, condenser and resistance with said supply conductors under the control of said first mentioned switch and comprising one of said double throw switches having its side contacts respectively connected with said supply conductors and its intermediate contact connected in circuit with said motor and first mentioned relay switch and with said first mentioned relay coil, condenser and resistance, detector switch means responsive to superposed sheets fed by said feeding means, and circuit connections connecting said second relay coil with said supply conductors under the control of said first mentioned switch and comprising the intermediate contact of the other of said double throw switches connected with said second relay coil, the side contact of said other double throw switch which is contacted by the latter intermediate contact when said second relay coil is in motor deenergizing condition connected with one of said supply conductors and said detector switch means connected between the other side contact of said second double throw switch and said one supply conductor to place said second relay coil in motor deenergizing condition responsive to superposed sheets fed by said feeding means.

7. In a photographic apparatus, the combination of claim 6 and further comprising said second relay switch means also comprising a switch connected in the circuit of said electrically energizable instrumentality to energize and deenergize the same respectively with energization and deenergization of said motor.

WILLIAM W. WIGHTMAN.

References Cited in the file of this patent

UNITED STATES PATENTS

| Number | Name | Date |
|---|---|---|
| 2,177,135 | Fassel | Oct. 24, 1939 |
| 2,435,099 | Pratt | Jan. 27, 1948 |
| 2,472,931 | Yohn | June 14, 1949 |